United States Patent [19]
Reinbold et al.

[11] Patent Number: 6,143,334
[45] Date of Patent: Nov. 7, 2000

[54] PASTA FILATA METHOD FOR MANUFACTURING SWISS-TYPE CHEESES

[75] Inventors: Robert S. Reinbold, Fond du Lac; Richard R. Willits, Elkhart Lake; Kim M. DeSmidt, Plymouth, all of Wis.

[73] Assignee: Sargento Foods Inc., Plymouth, Wis.

[21] Appl. No.: 09/082,258

[22] Filed: May 20, 1998

[30] Foreign Application Priority Data

| Oct. 3, 1997 | [FR] | France | 97 12382 |
| Jan. 22, 1998 | [FR] | France | 98 00873 |
| Mar. 20, 1998 | [FR] | France | 98 03707 |

[51] Int. Cl.⁷ ........................................ A23C 9/12
[52] U.S. Cl. .................. 426/36; 426/34; 426/42; 426/43; 426/580; 426/582
[58] Field of Search ................ 426/34, 36, 38, 426/39, 40, 42, 43, 580, 582

[56] References Cited

U.S. PATENT DOCUMENTS

| 4,226,888 | 10/1980 | Siecker | 426/36 |
| 4,460,609 | 7/1984 | Kristiansen et al. | 426/39 |
| 5,480,666 | 1/1996 | Lindgren | 426/512 |
| 5,529,795 | 6/1996 | Aldrovandi | 426/321 |

*Primary Examiner*—Leslie Wong
*Attorney, Agent, or Firm*—Ryan Kromholz & Manion, S.C.

[57] ABSTRACT

An pasta filata method of making cheeses that is capable of producing traditional hard and semi-hard cheeses of the Swiss and Baby Swiss varieties is described. Pursuant to the method, cheese milk at between 84° F.–96° F. and 0%–4% milk fat is inoculated with a bacterial culture appropriate to the variety of cheese being made. A milk coagulant is added to the cheese milk to form curd, which is cut. The temperature of the curd and whey mixture is raised a total of between 0° F.–18° F. over a period of time ranging from 20 minutes to 60 minutes. A portion of whey is removed from the curd. When the pH of the curd and whey mixture drops to between pH 5.80–6.20 the remaining whey is removed and the pH of the curd is allowed to drop to between pH 5.10–5.30. The curd is washed with fresh water at 45° F.–75° F. and dry-salted. The curd is fed into a pasta filata cheeses mixer/molder and cooked under hot water, thereby raising the temperature of the curd to between 120° F.–140° F., whereafter the cheese is formed into blocks in a plurality of cheese molds. The cheese molds are cooled in water of between 45° F.–55° F. and then vacuumed sealed in plastic bags, which are placed in boxes with lids. The boxed cheeses are immediately placed in a first storage area held at between 35° F.–45° F. for at least one week. The boxed cheeses are then placed in a second storage area at between 65° F.–80° F. for between 1 to 5 weeks. The cheese is thereafter cooled for at least one week at between 35° F.°45° F.

6 Claims, No Drawings

PASTA FILATA METHOD FOR MANUFACTURING SWISS-TYPE CHEESES

BACKGROUND OF THE INVENTION

The methods of manufacturing hard and semi-hard cheeses have traditionally been very different from the methods of manufacturing softer cheeses such as mozzarella, scamorza, and provolone. The softer cheeses listed above are classified as pasta filata cheeses. Pasta filata cheeses can be distinguished from other cheeses having similar characteristics by the cooking and stretching steps that are part of their manufacture. Pasta filata cheeses are cooked in hot water and stretched or kneaded to form plastic masses of molten cheese. These masses are then formed into the shapes in which the cheese will be sold. The cooking and stretching steps of the pasta filata method are unique to these softer types of cheeses. Heretofore this method has not been thought to be applicable to manufacturing Swiss-type cheeses.

The manufacture of hard and semi-hard pressed cheeses, and particularly Swiss cheese, begins with adding bacterial cultures to a vat of warmed milk. Adding an enzyme mixture then coagulates the milk. The coagulated milk is then "cut" into curds. The unsolidified liquid, called whey, is removed from the vat and the curd is cooked at an elevated temperature in the neighborhood of 120° F. for a short period of time of approximately 30 minutes. All excess whey is removed. The curd is placed in molds to form blocks of cheese. The blocks of cheese are also pressed in the molds to remove any whey that might yet be present in the curd. The blocks of cheese are then placed in a salt brine solution, allowing the salt to penetrate the cheese. Once the cheese has soaked for a predetermined length of time, it is removed from the brine vats and allowed to dry. Once dry, the blocks of cheese are sealed in plastic bags and placed in a ripening cellar to permit the bacterial cultures working in the cheese to give the cheese its flavor and, in the case of Swiss cheese, to form the familiar holes in the cheese. The specific process followed for each type of hard or semi-hard cheese varies greatly as the method of making the cheese has a dramatic impact on the desired characteristics of finished cheese. The process outlined above, however, is generally followed for cheeses of the Swiss cheese variety.

The process used to make a Swiss-type cheese requires special equipment, such as presses and brine tanks. The pasta filata method of making cheeses is much more efficient. Mozzarella is an example of a cheese that is produced using the pasta filata method and is described below as a means of distinguishing the pasta filata method from the methods used with traditional hard and semi-hard cheeses.

There are two basic ways to make mozzarella: direct acidification of the milk to form the curds or by means of the culture/rennet method. In both methods, raw milk is pasteurized and then coagulated to form curds. Once the curds reach a pH of about 5.2 they are mixed with hot water and formed into a taffy-like plastic mass. This formation of a plastic taffy-like mass is unique to cheeses in the "pasta filata" family, such as mozzarella, scamorza, and provolone. When the proper smooth, elastic consistency is reached, the plastic mass is formed by machine or by hand into balls. The loaves are placed or positioned in cold water so that they maintain their shapes while they cool. They are then salted and packaged. It is a short making process, usually less than 8 hours from raw milk to finished cheese.

The pasta filata method is a preferred method of manufacturing cheeses, given that it is very adaptable to modern high speed processing methods. However, it has not, until now, been considered useable for the production of hard and semi-hard cheeses such as Swiss (Emmentaler) or Baby Swiss type cheeses. The invention herein disclosed is for a pasta filata method of manufacturing Swiss-type cheeses.

Furthermore, in general, cheese-making facilities are set up to produce a single type of cheese, e.g. pasta filata cheeses, as opposed to Swiss-type cheeses, etc. An added benefit of the pasta filata method is that it requires no machinery change-over when a factory switches to the production of Swiss type cheeses from pasta filata type cheeses. The facility can, using the pasta filata method and the pasta filata production lines, instantaneously switch production from pasta filata cheeses to traditional hard and semi-hard cheeses, a possibility that was heretofore unknown.

Accordingly, it is the general objective of the present invention to produce traditional hard and semi-hard cheeses by the pasta filata method herein disclosed.

SUMMARY OF THE INVENTION

The present invention relates to the manufacture of hard and semi-hard cheeses, and more specifically to the manufacture of hard and semi-hard cheeses using a pasta filata method of manufacturing cheeses. Accordingly, the present invention may broadly be described as a process wherein a predetermined quantity of cheese milk is heated to a temperature within a predetermined temperature range. The cheese milk is then inoculated with at least one predetermined bacteria culture and allowed to set with a milk coagulant so that a mixture of curd and whey is formed. The temperature of this mixture is then raised to a second predetermined temperature range for a predetermined period of time. The whey is then removed from the mixture after the mixture reaches a pH within a first predetermined pH range. The remaining mixture, the curd, is then stirred or agitated until the pH reaches a second predetermined pH range. Subsequently, the remaining mixture is washed and salted and then cooked until its temperature reaches a third predetermined range and the mixture forms a generally plastic mass.

The pasta filata method of manufacturing cheese begins by providing a predetermined quantity of cheese milk at between 84° F. and 96° F. containing between 0% and 4% milk fat. The cheese milk is then inoculated with a predetermined mixture of bacteria cultures. The cheese milk is set with a milk coagulant to form the curd. As the curd is formed, the cheese milk becomes a mixture comprising a mass of curd and whey. The curd mass is cut into small pieces. The temperature of the mixture is raised from its initial state of between 84° F. and 96° F. by a total of between 0° F. and 18° F. to a range between 96° F. and 114° F. The rise in the temperature takes place over a period of 20 minutes to 60 minutes. Once the temperature has been raised, approximately one half of the whey is drawn off. The remaining whey is removed from the mixture when the pH of the mixture is between pH 5.80 and pH 6.20. The curd is then dry-stirred until the pH of the curd falls to between pH 5.10 to pH 5.30, whereupon the curd is washed with water having a temperature between 45° F. to 75° F. A predetermined quantity of salt is then added to the washed curd. The curd is cooked in a pasta filata mixer/molder to raise the temperature of the curd mass to between 120° F. to 140° F. so as to create a plastic curd mass. Portions of the plastic curd mass are placed in a plurality of cheese molds to create a plurality of cheeses. The cheeses are cooled in the cheese molds with water having a temperature between 45° F. and 55° F. The cheeses are removed from the cheese molds and vacuum sealed in a plurality of plastic bags. Next, the bagged cheeses are placed in a plurality of boxes, each box having a lid. The boxed cheeses are stored in a first storage area for at least 1 week at temperatures between 35° F. to 45° F. The boxed cheeses are next stored in a second storage area for 1 to 5 weeks at temperatures between 65° F. to 80° F. Finally, the boxed cheeses are stored in a cooling area at temperatures between 35° F. to 45° F. for at least one week.

The pasta filata method described above is capable of producing hard and semi-hard cheeses of the Swiss or Baby Swiss type. The hard and semi-hard cheeses identified above are produced with the pasta filata method by varying the types and quantities of bacterial cultures used to inoculate the cheese milk. In order to produce a cheese of the Swiss variety, the cultures of bacteria are chosen from the group comprising *Lactobacillus helveticus, Lactobacillus delbrueckii* subspecies *bulgaricus, Streptococcus thermophilus,* and *Propionibacterium freudenreichii* subspecies *shermanii.*

To produce cheese of the Baby Swiss variety, the cultures of bacteria are chosen from the group comprising *Lactococcus lactis* subspecies *cremoris, Lactococcus lactis* subspecies *lactis,* and *Propionibacterium freudenreichii* subspecies *shermanii.*

In order to achieve a desired flavor in a Baby Swiss type cheese, it may be necessary to add a debittering adjunct. This debittering agent may be a bacterial culture of *Lactobacillus helveticus.*

It will be apparent to those skilled in the art who read this disclosure that the present invention may be applied to the manufacture of other cheeses not specifically disclosed or claimed herein.

DETAILED DESCRIPTION

Although the disclosure hereof is detailed and exact to enable those skilled in the art to practice the invention, the physical embodiments and methodology herein disclosed merely exemplify the invention which may be embodied in other specific methodology and/or structure. While the preferred embodiment has been described, the details may be changed without departing from the invention, which is defined by the claims.

The present invention permits the use of existing cheese-making machinery arranged to implement the pasta filata method of making cheeses. Using this method it is possible to manufacture zero fat, low fat, light, reduced fat, or full fat hard and semi-hard cheeses such as Swiss or Baby Swiss cheeses by means of a pasta filata method of making cheese.

In the production of Swiss cheese using the pasta filata method, a predetermined quantity of milk having a milk fat content of between 0% and 4% is brought to a temperature of between 84° F. and 96° F. This milk, called cheese milk, is then inoculated with appropriate strains of bacteria. The temperature of the milk and the quantity of milk fat present in the milk may be adjusted to achieve the desired characteristics in the finished cheese. In the case of Emmantaler-type Swiss cheese the inoculant may consist of strains of *Lactobacillus helveticus* and/or *Lactobacillus delbrueckii* subspecies *bulgaricus* and *Streptococcus thermophilus* and *Propionibacterium freudenreichii* subspecies *shermanii.* The exact mixture of these strains of bacteria is dependent upon the qualities of the finished cheese that are desired. Once the milk has been inoculated, a suitable milk coagulant is added so as to form the curd. One such suitable milk coagulant is a fermentation-derived chymosin coagulant. However, it is to be understood that other milk coagulants may be used without straying from the scope of this invention.

Once the curd is formed, it is cut, and the temperature of the curd and whey mixture is raised from its initial temperature range of 84° F. to 96° F. by an amount ranging from 0° F.–18° F. to a range of between 96° F. to 114° F. over a period of time ranging from 20 to 60 minutes. Approximately one half of the whey is removed from the curd and whey mixture. The pH of the mixture is allowed to drop until the pH is in the range of pH5.80–pH6.20. At this point the remaining whey is drained from the curd and the curd is dry-stirred, i.e. stirred without the presence of liquid, until the pH of the curd drops to within the range of pH5.10–pH5.30. It should be noted here that the drop in pH that is described during the cheese making process due to the activity of the bacterial cultures present within the curd.

The curd is washed in water having a temperature of between 45° F.–75° F. and is dry-salted by adding a predetermined quantity of salt to the washed curd. Unlike conventional Swiss cheese manufacturing methods, the salted washed curd is sent through a pasta filata cheese mixer/molder of a type well known in the industry, where it is kneaded under hot water until the curd has a temperature in the range of 120° F.–140° F. The curd is transformed into a plastic curd mass in the pasta filata cheese mixer/molder which is extruded into molds to form individual cheeses. The individual cheeses are then cooled by water having a temperature in the range of 45° F.–55° F.

Once the cheeses have been sufficiently cooled to retain their shape when handled, the blocks of cheese are removed from the molds and are vacuum-sealed into plastic bags. Each bagged cheese is then placed in a box having a cover. The boxes of cheese are next placed in a storage area for at least one week at temperatures ranging from 35° F to 45° F. After this initial aging, the blocks of cheese are placed in a second storage area for 1 to 5 weeks at a temperature of between 65° F. to 80° F. Finally, the cheese is placed in a cooling area for at least one week at temperatures ranging from 35° F. to 45° F. Cheese made by this process will have the appearance, body, texture, flavor, and chemical composition of Swiss cheese.

This pasta filata method of manufacturing cheese can be altered to produce cheese having the characteristics of a Baby Swiss cheese by changing the mixture of bacteria used to inoculate the cheese milk. Baby Swiss cheese is made by this method by inoculating the cheese milk with strains of *Lactococcus lactis* subspecies *cremoris* and/or *Lactococcus lactis* subspecies *lactis* and *Propionibacterium freudenreichii* subspecies *shermanii. Lactobacillus helveticus* may be added as a flavor former and debittering adjunct. The exact mixture of the bacteria cultures depends upon the particular characteristics desired in the finished cheese. The bacteria cultures may be frozen or none frozen, however, use of frozen cultures is presently considered best.

EXAMPLE 1

One example of a cheese made using the method described above produced a cheese having substantially the appearance, body, texture, and flavor characteristics of Baby Swiss. This particular cheese was made from 514.6 lbs. of cheese milk having 3.4% milk fat content and a pH of 6.86. To the cheese milk was added 36.07 lbs. of cream having a cream fat percentage of 48.5% and a pH of 6.92. The cheese milk and cream mixture had a combined pH of 6.74 and a temperature of 60° F. The cheese milk was then heated to 88.2° F. over approximately 55 minutes. The cheese milk and cream mixture was then inoculated with a 0.5% skim milk *Lactococcus lactis* subspecies *cremoris* and *Propionibacterium shermanii* bacteria cultures. The inoculated cheese milk was then set with 25 ml of a fermentation-derived chymosin coagulant. After the addition of the starters and the coagulant, the bottom of the vat containing the cheese milk was stirred for 15 minutes, during which time the temperature of the cheese milk dropped to 87.5° F. The resulting curd was cut using a ¼" knives.

The newly formed curd was stirred for approximately one hour. After stirring the temperature of the curd was 90.0° F.

The curd was then cooked by raising the temperature of the curd and whey mixture from 90.0° F. to 99.7° F. in 45 minutes. At the end of this cook period, the pH of the curd was 6.34. Thirty minutes later, one-half of the whey was drawn off and the pH was allowed to drop from pH 6.20 to pH 5.98, taking approximately 43 minutes. The rest of the whey was then removed and the pH of the curd was allowed to drop to pH 5.25, in approximately one hour and 47 minutes. The curds were then washed with seven gallons of water at 55° F. and then dry salted with 1.25 lbs. of salt, which raised the pH of the curd to 6.11. The dry salted curd was next passed through a pasta filata cheese mixer/molder operating at 165° F., raising the temperature of the curd to 130° F. The resulting plastic curd mass, having a pH of 5.20, was then formed into individual cheeses in molds and cooled in 55° F. water.

The blocks of cheese were removed from the molds, placed in breathable plastic bags, and placed in covered boxes. The boxed cheeses were placed in a first storage area for two weeks at 36° F. Next, the boxed cheeses were placed in a second storage area at 74° F. for two weeks. This trial run produced 44.20 lbs. of finished cheese that had the appearance, body, texture, flavor, and eye development characteristic of Baby Swiss. The cheese had approximately 27.5% fat, 43.2% moisture, a pH of 5.35, and a salt content of 1.04%. Accordingly, it should be noted that this particular cheese does not meet the specific definition of Baby Swiss since such a cheese must have a maximum moisture content of 43% and a minimum fat content of 45%; Fat on the Dry Basis (FDB).

EXAMPLE 2

Another example of a cheese made using the method described above produced a cheese having the appearance, body, texture, flavor, and eye development characteristics of Emmentaler-type Swiss. This particular cheese was made from 515.5 lbs. of cheese milk having 3.4% milk fat content and a pH of 6.87. To the cheese milk was added 37 lbs. of cream having a cream fat percentage of 42% and a pH of 6.95. The cheese milk and cream mixture had a combined pH of 6.78 and a temperature of 61.3° F. The cheese milk was then heated to 93.8° F. over approximately 90 minutes. During the intervening 90 minutes the pH of the cheese milk dropped to 6.59.

The cheese milk and cream mixture was then inoculated with a 0.5% skim milk *Streptococcus thermophilus* culture and a 0.5% skim milk *Lactobacillus helveticus* culture. The inoculants comprised a 1:1 ratio between the rod and coccus variety bacteria. The cheese milk was continuously stirred during the addition of the inoculants. During the approximately 15 minute period in which the inoculants were added to the cheese milk, the temperature of the cheese milk rose to 94° F. The inoculated cheese milk was then set with 25 ml of a fermentation-derived chymosin coagulant.. After the addition of the starters and the coagulant, the bottom of the vat containing the cheese milk was stirred for 35 minutes, during which time the temperature of the cheese milk dropped to 94° F.

The curd was then cooked by raising the temperature of the curd and whey mixture from 94° F. to 105.6° F. in 44 minutes. At the end of this cook period, the pH of the curd had dropped from 6.57 to 6.41. Approximately 20 minutes later, one-half of the whey was drawn off and the pH, now at 6.03, was allowed to drop to pH 5.73, over the course of approximately 30 minutes. The rest of the whey was then removed and the curd was washed in seven gallons of water at 55° F. The pH of the curd dropped to pH 5.10, during the approximately 35 minutes it took to drain the remaining whey and wash the curd. The curd was then dry salted with 1.25 lbs. of salt, in three discrete applications. The dry salted curd was next passed through a pasta filata cheese mixer/molder operating at 165° F. and at speeds of 30–55 rpm. The pasta filata cheese mixer/molder raised the temperature of the curd to 130° F. The resulting plastic curd mass was then formed into individual cheeses in molds and cooled in 55° F. water.

The individual blocks of cheese were then aged in the same manner as that disclosed in Example 1. The blocks of cheese were removed from the molds and placed in breathable plastic bags, which were placed in covered boxes. The boxed cheeses were placed in a first storage area for two weeks at 36° F. Next, the boxed cheeses were placed in a second storage area at 74° F. for two weeks. This trial run produced 49.0 lbs. of finished cheese that had the appearance, body, texture, flavor, and eye development characteristic of Emmantaler-type Swiss cheese. It is to be noted that the acid development of this particular batch of cheese was markedly more rapid than the batch of cheese described in Example 1.

EXAMPLE 3

Another example of a cheese made using the method described above produced a cheese having the appearance, body, texture, and flavor characteristics of Baby Swiss. This particular cheese was made from 478.5 lbs. of cheese milk having 3.2% milk fat content. To the cheese milk was added 36.6 lbs. of cream having a cream fat percentage of 43.5%. The cheese milk and cream mixture had a combined pH of 6.74 and a temperature of 61° F. The cheese milk was then heated to 87.5° F. over approximately 95 minutes. The cheese milk and cream mixture was then inoculated with a 0.5% skim milk *Lactococcus lactis* subspecies *cremoris* and *Propionibacterium shermanii* bacteria cultures. The inoculated cheese milk was then set with 30 ml of a fermentation-derived chymosin coagulant. After the addition of the starters and the coagulant, the bottom of the vat containing the cheese milk was stirred for 15 minutes, during which time the temperature of the cheese milk dropped to 87.0° F. The resulting curd was cut using a 0.25 inch knives.

The newly formed curd was stirred for approximately 15 minutes. After stirring the temperature of the curd was 86.8° F.

The curd was then cooked by raising the temperature of the curd and whey mixture to 100.1° F. in 47 minutes. At the end of this cook period, the pH of the curd was 6.51. Thirty-eight minutes later, one-half of the whey was drawn off and the pH was allowed to drop to 6.28. The rest of the whey was then removed and the pH of the curd was allowed to drop to pH 6.21, in approximately 55 minutes. The curd was then washed with seven gallons of water at 55° F. and then dry salted with 1.0 lbs. of salt. The dry salted curd was next passed through a pasta filata cheese mixer/molder operating at 150° F., raising the temperature of the curd to 130° F. The resulting plastic curd mass, having a pH of 5.56, was then formed into individual cheeses in molds and cooled in 55° F. water.

The blocks of cheese were removed from the molds, placed in breathable plastic bags, and placed in covered boxes. The boxed cheeses were aged for six days. This experimental run produced 48,75 lbs. of finished cheese that had the appearance, body, texture, flavor, and eye development characteristic of Baby Swiss. The cheese had approximately 28.25% fat, 41.6% moisture, a pH of 5.51, and a salt content of 0.70%. Accordingly, it should be noted that this particular cheese does meet the specific definition of Baby Swiss since such a cheese must have a maximum moisture of 43% and a minimum of 45% FDB.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A method for manufacturing Swiss-type cheese comprising:

heating a quantity of cheese milk to a first elevated temperature range between 84° and 96° F.;

inoculating the cheese milk with at least one bacteria culture;

setting the cheese milk with a milk coagulant to form a curd mass and whey mixture;

raising the temperature of the mixture to a second elevated temperature range between 96° F. and 114° F. for 20 to 60 minutes;

removing said whey from said mixture when said mixture reaches a pH within a first pH range of between 5.8 and 6.2;

agitating the remaining mixture until said pH reaches a second pH range of between 5.1 and 5.3;

washing and salting said remaining mixture;

cooking said remaining mixture until said remaining mixture reaches a third elevated temperature range of 120° F. to 140° F. and said remaining mixture forms a generally plastic mass.

2. A method of manufacturing Swiss-type cheese comprising the steps of:

providing a predetermined quantity of cheese milk at between 84° F. and 96° F., the cheese milk having between 0% and 4% milk fat contained therein;

inoculating the cheese milk with a predetermined mixture of bacteria cultures;

setting the cheese milk with a milk coagulant to form a curd mass and whey mixture from the cheese milk;

cutting the curd mass into small pieces;

raising the temperature of the mixture by a total of between 0° F. and 18° F. from the initial temperature range of between 84° F. and 96° F. to a second range of temperatures of between 96° F. to 114° F. over a period of 20 minutes to 60 minutes;

drawing off a portion of the whey;

removing the remaining whey from the mixture when the pH of the mixture is between pH 5.80 and pH 6.20;

dry-stirring the remaining curd until the pH of the curd falls to between pH 5.10 to pH 5.30;

washing the curd with water having a temperature between 45° F. to 75° F.;

adding a predetermined quantity of salt to the washed curd;

cooking the curd in a pasta filata mixer/molder under hot water to raise the temperature of the curd mass to between 120° F. to 140° F. so as to create a plastic curd mass;

placing a plurality of portions of the plastic curd mass in a plurality of cheese molds to form a plurality of cheeses;

cooling the cheeses in the cheese molds with water having a temperature between 45° F. and 55° F.;

removing the cheeses from the cheese molds and vacuuming sealing the cheeses in a plurality of plastic bags;

placing the bagged cheeses in a plurality of boxes, each box having a lid;

storing the boxed cheeses in a first storage area for at least 1 week at 35° F. to 45° F.;

storing the boxed cheeses in a second storage area for 1 to 5 weeks at 65° F. to 80° F.; and storing the boxed cheeses in a cooling area at 35° F. to 45° F. for at least one week.

3. The method of manufacturing Swiss-type cheese of claim 2 wherein the cultures of bacteria are selected from the group consisting of *Lactobacillus helveticus, Lactobacillus delbrueckii* subspecies *bulgaricus, Streptococcus thermophilus,* and *Propionibacterium freudenreichii* subspecies *shermanii.*

4. The method of manufacturing Swiss-type cheese of claim 2 wherein the cultures of bacteria are selected from the group consisting of *Lactococcus lactis* subspecies *cremoris, Lactococcus lactis* subspecies *lactis,* and *Propionibacterium freudenreichii* subspecies *shermanii.*

5. The method of manufacturing Swiss-type cheese of claim 4 further comprising the addition of a debittering adjunct.

6. The method of manufacturing Swiss-type cheese of claim 5, wherein the debittering adjunct is *Lactobacillus helveticus.*

* * * * *

UNITED STATES PATENT AND TRADEMARK OFFICE
CERTIFICATE OF CORRECTION

PATENT NO. : 6,143,334
DATED : 7 November 2000
INVENTOR(S) : Robert S. Reinbold, Richard E. Willits, Kim M. DeSmidt It is certified that error appears in the above-identified patent and that said Letters Patent are hereby corrected as shown below:

[75] Inventors
Second line, please delete "Richard R." and insert -- Richard E. --.

[57] Abstract
First line, please delete "An" and insert -- A --.

Signed and Sealed this

Twenty-ninth Day of May, 2001

Attest:

NICHOLAS P. GODICI

Attesting Officer    Acting Director of the United States Patent and Trademark Office